US010383347B2

(12) United States Patent
Lanter

(10) Patent No.: US 10,383,347 B2
(45) Date of Patent: Aug. 20, 2019

(54) EXTRUDED ANIMAL FEED WITH GELATIN BINDER AND LOW STARCH CONTENT AND METHOD OF MAKING

(75) Inventor: Kent Lanter, Waterloo, IL (US)

(73) Assignee: PURINA ANIMAL NUTRITION LLC, Shoreview, MN (US)

(*) Notice: Subject to any disclaimer, the term of this patent is extended or adjusted under 35 U.S.C. 154(b) by 443 days.

(21) Appl. No.: 13/294,789

(22) Filed: Nov. 11, 2011

(65) Prior Publication Data
US 2012/0207907 A1 Aug. 16, 2012

Related U.S. Application Data

(63) Continuation-in-part of application No. 11/646,702, filed on Dec. 28, 2006, now Pat. No. 8,632,833.

(51) Int. Cl.
A23K 40/25 (2016.01)
A23K 40/10 (2016.01)
A23K 40/20 (2016.01)
A23K 20/147 (2016.01)
A23K 50/80 (2016.01)
A23P 30/20 (2016.01)
A23L 29/281 (2016.01)
A23L 11/00 (2016.01)
A23L 33/15 (2016.01)
A23L 33/16 (2016.01)

(52) U.S. Cl.
CPC .......... A23K 40/25 (2016.05); A23K 20/147 (2016.05); A23K 40/10 (2016.05); A23K 40/20 (2016.05); A23K 50/80 (2016.05); A23L 11/07 (2016.08); A23L 29/284 (2016.08); A23L 33/15 (2016.08); A23L 33/16 (2016.08); A23P 30/20 (2016.08); A23V 2002/00 (2013.01); A23V 2200/21 (2013.01); A23V 2250/5432 (2013.01); A23V 2300/16 (2013.01)

(58) Field of Classification Search
CPC ........ A23V 2002/00; A23V 2250/5432; A23V 2200/228; A23V 2300/16; A23K 1/003; A23K 1/188; A23K 1/1631; A23K 1/002; A23L 1/302; A23L 1/2006; A23L 1/304; A23L 1/0076; A23L 1/0562
USPC ................ 426/104, 623, 573, 576, 578, 316
See application file for complete search history.

(56) References Cited

U.S. PATENT DOCUMENTS

| | | | |
|---|---|---|---|
| 2,622,027 A * | 12/1952 | Torr | A23J 1/10 241/23 |
| 3,881,024 A | 4/1975 | Pahoundis, Sr. et al. | |
| 3,889,007 A | 6/1975 | Gunter et al. | |
| 3,982,003 A | 9/1976 | Mitchell et al. | |
| 4,048,268 A | 9/1977 | Ludwig | |
| 4,153,735 A * | 5/1979 | Mommer | A23K 40/25 426/285 |
| 4,310,558 A | 1/1982 | Nahm, Jr. | |
| 4,837,112 A | 6/1989 | Calandro et al. | |
| 4,892,748 A | 1/1990 | Andersen et al. | |
| 4,988,520 A | 1/1991 | Overton | |
| 5,120,565 A * | 6/1992 | Lanter | A23K 40/25 426/448 |
| 5,204,102 A | 4/1993 | Coles et al. | |
| 5,217,740 A | 6/1993 | Lanter | |
| 5,227,190 A | 7/1993 | Ward | |
| 5,683,739 A | 11/1997 | Lanter et al. | |
| 5,714,184 A | 2/1998 | Major | |
| 5,731,029 A | 3/1998 | Karwowski et al. | |
| 5,811,148 A | 9/1998 | Chiu et al. | |
| 5,894,029 A | 4/1999 | Brown et al. | |
| 6,299,924 B1 | 10/2001 | Chiu et al. | |
| 6,306,427 B1 | 10/2001 | Annonier et al. | |
| 6,746,698 B2 | 6/2004 | Freeman | |
| 6,805,884 B2 | 10/2004 | Kurzinger | |
| 6,830,771 B2 | 12/2004 | Lanter et al. | |
| 6,841,179 B2 * | 1/2005 | Lin et al. | 426/2 |
| 6,863,783 B2 | 3/2005 | Lin et al. | |
| 2002/0039616 A1 * | 4/2002 | Lanter et al. | 426/576 |
| 2004/0161495 A1 * | 8/2004 | Sergheraert | A23K 1/1853 426/61 |

FOREIGN PATENT DOCUMENTS

| | | |
|---|---|---|
| EP | 1 405 570 | 4/2004 |
| GB | 2 252 710 | 8/1992 |
| WO | WO 2004/039171 | 5/2004 |

OTHER PUBLICATIONS

Igoe, Robert S.; Hui, Y. H. (2001). Dictionary of Food Ingredients (4th Edition). (pp. 31, 84). Springer—Verlag. Online version available at: http://www.knovel.com/web/portal/browse/display?_EXT_KNOVEL_DISPLAY_bookid=1092& VerticalID=0.
Abstract, JP 62-151145,Jul. 6, 1987, San Ei Chem Ind Ltd.
International Search Report from counterpart foreign application No. PCT/US2007/025070 filed on Dec. 7, 2007.
"The Corn Refining Process", Corn Refiners Association, 2 pages, downloaded from http://corn.org/wp-content/uploads/2009/11/ComRefiningProcess.pdf on Jul. 24, 2014.
Analysis Report, N. P. Analytical Laboratories, 3 pages, Jul. 16, 2014.
Laboratory Test Method Summary, N.P. Analytical Laboratories, 1 page, Aug. 30, 2013.

* cited by examiner

Primary Examiner — Jyoti Chawla
(74) Attorney, Agent, or Firm — Dorsey & Whitney LLP

(57) ABSTRACT

The present invention includes methods for producing an extruded food particle by extruding through an extruder having a screw within a barrel, a composition containing nutritional food components, and gelatin in an amount sufficient to act as a binder when the composition exits the extruder, where the binder has essentially no starch. The present invention also includes extruded food particles that do not use starch as a binder.

18 Claims, 1 Drawing Sheet

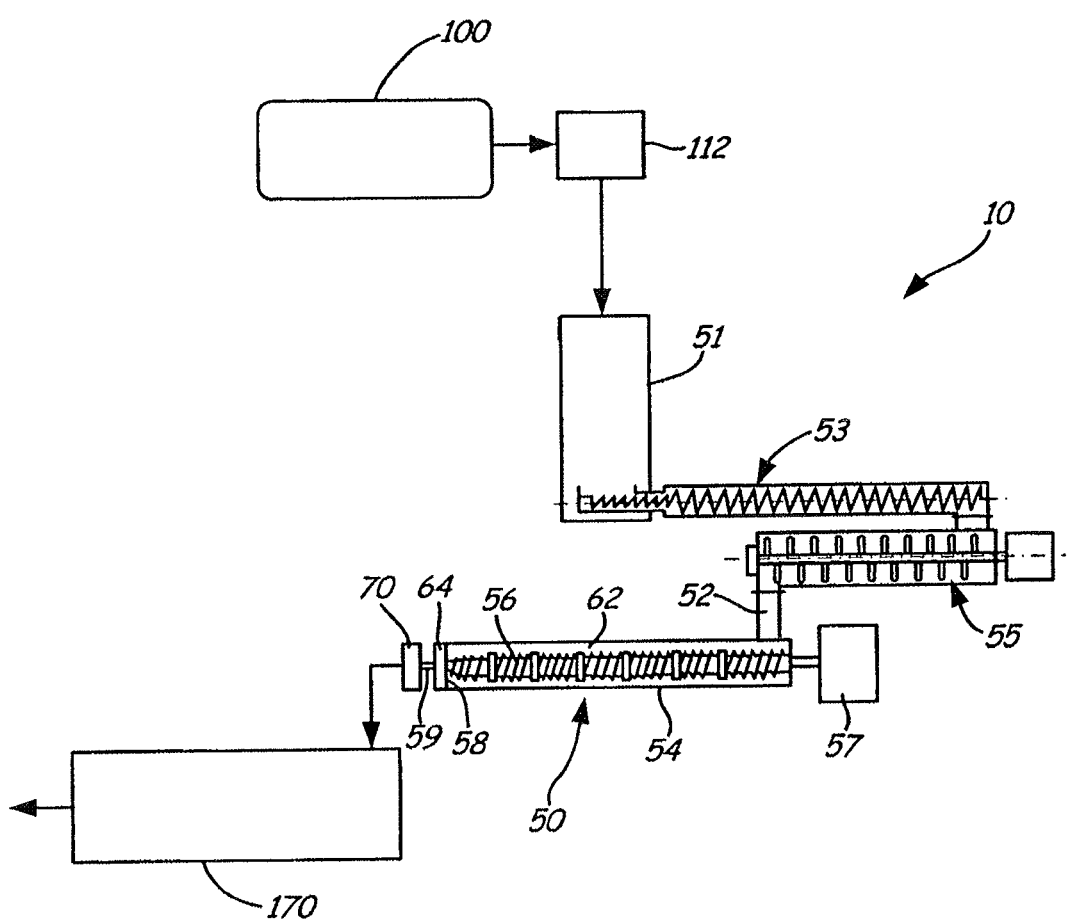

EXTRUDED ANIMAL FEED WITH GELATIN BINDER AND LOW STARCH CONTENT AND METHOD OF MAKING

CROSS-REFERENCE TO RELATED APPLICATION

This application is a continuation-in-part of and claims priority to U.S. patent application Ser. No. 11/646,702, filed Dec. 28, 2006 and entitled "High Fiber Extrusion," the contents of which are herein incorporated by reference in their entirety.

BACKGROUND OF THE INVENTION

The present invention generally relates to extrusion of feed and food products. More specifically, the present invention relates to methods of extruding feed and food products that uses gelatin rather than starch as a binder during extrusion. The present invention also includes extruded feed and food products that contain gelatin as the binder and little, if any starch.

Extrusion cooking devices have long been used in the manufacture of a wide variety of edible and other products such as human food and animal feeds. For example, large extruders have been used for many years for the production of dry chunk-type dog foods. Generally speaking, such equipment includes an extruder having an elongated, tubular barrel with one or two elongated, helically flighted, axially rotatable screws therein. A multiple-orifice die is normally attached to the outlet end of the extruder barrel and is the prime means for shaping the extrudate.

In use, a material to be processed is passed into and through the extruder barrel and is subjected to increasing levels of temperature, pressure and shear. As the material emerges from the extruder die, it is fully cooked and shaped and may typically be subdivided using a rotating knife assembly. Conventional extruders of this type are shown in U.S. Pat. Nos. 4,763,569; 4,118,164 and 3,117,006.

Materials undergoing extrusion typically include a binder to improve internal cohesive strength so that the final product is less likely to fracture and create dust and wastage. Starch is a preferred binder for extruding food products since conditions during extrusion facilitate starch gelatinization that helps adhere each of the food components to one another in the final extruded product.

Unfortunately, quantities of starch are not always desired in food products, for many animals, such as gorillas, dogs, cats, horses, humans and the like. As a result, it is desired to produce a product containing virtually no starch.

SUMMARY OF THE INVENTION

The present invention includes a method for producing a food particle by processing through an extruder having a screw within a barrel, a composition containing nutritional food components to form the food particle. The composition has essentially no starch and a gelatin in an amount sufficient to act as a binder once the composition exits the extruder. In some implementations, the composition has a binder consisting essentially of gelatin that is substantially distributed throughout the food composition once the food composition exits the extruder.

BRIEF DESCRIPTION OF THE DRAWINGS

The FIGURE is a schematic view of a process that is used to produce an extruded food particle in accordance with the present invention.

DETAILED DESCRIPTION

The present invention includes the use of gelatin as a binder rather than starch to extrude a food composition and form extruded particles. A process for producing an extruded particle is generally depicted at 10 in FIG. 1. By the term "particle" is meant a composite made of food or feed fragments bound together. In the process 10, water and a food composition containing nutritional food components, essentially no starch and a binder are introduced into an extruder 50 that includes a meal bin 51, a feeder 53, a conditioner 55, an inlet 52, an elongated tubular barrel 54, and at least one screw 56 located within the barrel 54, and an outlet 58. The binder comprises gelatin. The extruder 50 extrudes the food composition at a temperature of at least about 180° F. to form an extruded particle in which the gelatin functions as a binder to bind the extruded food composition in the form of a particle after exiting the extruder 50.

Prior art particles that are made using extrusion include one or more starches. During extrusion of prior art starch containing pellets, starch gelatinizes under temperature (normally above 212° F.), pressure and shear conditions in the extruder and serves as the binding matrix that binds other food components included as part of the food composition to form a particle. As a result, the extruded particle is held together by the gelatinized starch matrix.

It has also been discovered that in an extrusion process gelatin can be used as the binder. The gelatin forms a gel when heated to its solubilization temperature and subsequently cooled to a temperature of less than about 100° F. The gelatin, formed as a gel, binds the food components and is included as part of the food composition that is subsequently extruded to form an extruded food product. For example, binder consisting essentially of gelatin may bind food components when substantially distributed throughout the food composition once the food composition exits an extruder described below.

Water is mixed with the food composition at a concentration that ranges from about 10 weight percent to about 35 weight percent of the food composition in the conditioner 55 to form a mash. In addition, steam is added to increase the temperature of the mash in the conditioner section 55. Water may also be added to the food composition in the form of steam or hot or cold liquid water when forming the heated mash. While water and/or steam may be added at the inlet, middle or outlet portion of the extruder during conventional extrusion of food products, water is preferably added to the conditioner section 55 and/or to the barrel inlets section 52, and prior to cooking in the extruder 50. The amount of water and/or steam applied to the mixture is controlled by known valving techniques in a manner to obtain desired temperatures of the conditioned meal. Additional heat is created by the mechanical energy imparted by the rotating screw and forced through a restricted orifice to cause the desired chemical and physical reactions within the heated mash. The amount of water and/or steam will vary with the nature and ratio of nutritional feed components and the other operating parameters of the extruder, such as pressure, residence time of the cooked mash and the like.

The food composition typically includes nutritional components that provide nutritional food factors to the diet of the animal consuming the extruded food product. Nutritional components generally include factors such as protein, fat, fiber, vitamins and minerals. The weight percentage of the nutritional components in the food composition can vary. In some preferred embodiments, the food composition includes at least about 85 percent by weight of nutritional components. In more preferred embodiments, the food composition includes at least about 90 percent by weight of nutritional components.

Some non-exhaustive examples of nutritional components include corn, wheat, oats, barley, sorgum, rice, soybean hulls, soybean meal, aspen, amino acids, dried beet pulp, cane molasses, oat hulls, sucrose, flaxseed, soybean oil, Brewers yeast, poultry meal, chicken meal, fish meal, oat bran; vitamins, such as riboflavin, d-alpha-tocopheryl acetate, tocopherols, biotin, cholecalciferol, calcium panthothenate, vitamin A acetate, vitamin K, ascorbic acid, pyridoxine, thiamin mononitrate, nicotinic acid, cyanocobalmin, and choline chloride; minerals, such as sodium sesquicarbonate, salt, dicalcium phosphate, monocalcium phosphate, magnesium sulfate, potassium sulfate, calcium carbonate, magnesium oxide, calcium propionate, manganous oxide, zinc oxide, ferrous carbonate, copper sulfate, zinc sulfate, calcium iodate, cobalt carbonate, and sodium selenite; and any combination of any of these.

Typically, the food composition that contains nutritional food components, such as protein, fat, carbohydrates, vitamins, minerals and other components along with the gelatin are first blended in a ribbon mixer 100 to form a relatively homogeneous mixture. The homogenous mixture is then ground in a grinder 112, such as a Hammermill grinder to form a ground mixture. For example, the mixture may be ground through a screen having a size of about $12/64$ inches or less to provide a particle size that is at least less than about $12/64$ inches before extruding, through a screen having a size of about ⅛ inches to provide a particle size that is at least less than about ⅛ inches before extruding, through a screen having a size of about $6/64$ inches to provide a particle size that is at least less than $6/64$ inches before extruding. After grinding, the ground mixture and water are processed in the extruder 50 to form an extruded product. The extruded product is transferred from the extruder 50 into a horizontal dryer 170 that reduces the moisture content of the extruded product.

In general, the gelatin of the food composition may have a concentration of from about 0.05 to more than about 30 weight percent, based on the weight of the food composition and preferably 0.2 to about 15 weight percent and most preferably about 0.5 to 5% weight percent. When the final extruded product has a particle size of less than about ⅜ inches, about 0.2 to about 3.0 weight percent of the gelatin is generally used during extrusion while about 0.3 to about 5 weight percent of the gelatin is included when the final extruded particle has a particle size of ⅜ inch or larger. When forming an extruded food product for an herbivore, the concentration of the gelatin typically ranges from about 0.1 weight percent to about 15 weight percent during extrusion.

As used herein, the term gelatin refers to gelatin(s) that solubilize (hydrate) at an elevated temperature and then set when cooled and preferably form a gel. The temperature at which the gelatin solubilizes (hydrates) and the temperature at which the gelatin "sets" (gels) can vary with the particular gelatin used. The term gelatin refers to a protein product derived from collagen. Gelatin as used herein is an irreversibly hydrolyzed form of collagen, the collagen being extracted from animal skin and/or bones. Gelatin melts to a liquid when heated and solidifies when cooled again. The gel formed from gelatin exists when the temperature falls below the melting point of the gelatin, which may depend on the gelatin grade and concentration. In some implementations, upon exiting the extruder the composition including gelatin is cooled at least to a temperature at which the gelatin sets to form a gel, thus providing a gelatin that is settable upon cooling. Currently, gelatin derived from a porcine source is preferred. One reason to use a porcine derived gelatin is to avoid protein from a ruminant source. The typical setting temperature of a porcine derived gelatin is about 20 to 30° C.

In general, the gelatin used as the binder in the food composition may have a concentration greater than about 0.1 weight percent, based on the weight of the food composition and preferably 0.5 to about 15 weight percent and most preferably about 1.0 to 10 weight percent. In one exemplary embodiment, when the final extruded product has a particle size of about $5/32$ inches, gelatin concentration between about 0.5 weight percent to about 10.0 weight percent of is generally used during extrusion. When forming an extruded food product that needs to be floatable such as fish feed, the concentration of the gelatin typically may range from about 0.3 weight percent to about 10 weight percent during extrusion.

By "soluble fiber" is meant a fiber source or polysaccharide that is soluble in water and not capable of digestion by human and monogastric animal enzymes. Furthermore, the term "soluble fiber" is not meant to include insoluble fiber or fiber that is not soluble in water.

By "essentially no starch" is meant that the starch has a concentration of less than about 15 weight percent as part of the food composition of the final dried extruded product exiting the extruder. For example, the concentration of starch is less than about 15 weight percent when forming an extruded product that is suitable for consumption by a cat, monkey, horse, other hoof-stock animals, and any other herbivore, omnivore, or carnivore. Furthermore, by "essentially no starch" is also meant the starch is in insufficient amount to serve as the binder for the extruded product upon exiting the extruder or in insufficient amount to make the particles durable enough for handling by conveying equipment. In some implementations, the form of starch in the extruded product is one that does not serve as a binder in the food composition. For example, the food composition may include corn grain, but the starch within the corn grain may be protected and therefore unavailable or in an insufficient form to serve as a binder.

As used herein, the term "starch" refers to a polymer of glucose or a homo-polysaccharide made up of glucose molecules that are easily digested and can be readily hydrolyzed by typical mono-gastric animal or human digestive enzymes, such as amylase. By "homo-polysaccharide" is meant a polysaccharide that contains only one type of sugar molecule. The term "starch" includes both unrefined starch that may be found as part of grain components of the extruded food or feed, refined starch or both.

The amount of nutritional food components may vary with the design of the extruder 50 and its operating conditions. In addition, the concentration of water of both the extruded food particle and the heated mash in the extruder before, during and subsequent to its cooking can also vary.

The extruder 50 may be any conventional extrusion device, such as that described in U.S. Pat. No. 3,496,858. As used herein, the term "extruder" or "extrusion cooker" refers to a cooking device that includes a tubular barrel 54 having an inlet 52 and an outlet 58 and presenting an inner surface defining an elongated bore 62. The "extruder" or "extrusion cooker", as used herein, also includes at least one elongated, helically flighted screw assembly 56 within the bore 62 whether the flights are continuous or interrupted, motive means 57 for axially rotating the screw assembly, and an apertured extrusion die 64 disposed across the barrel outlet. The die 64 contains at least one restricted orifice and the cooking device generally operates under high temperature and pressure conditions that shear, cook and plasticize the heated mash passing therethrough. Furthermore, it is to be understood that the terms "extruder" or "extrusion cooker" are not meant to encompass "pellet mills" that are used to form pellets by compressing ingredients together.

As noted, water and the ground mixture are fed to the extruder 50, typically through the conditioner. The extruder usually operates at a temperature of at least about 180° F. and this temperature in combination with the pressure caused by the action of the rotating screw on the heated mash and the friction between the moving heated mash and the component parts of the extruder 50 result in a pressure within the extruder sufficient to maintain temperature. The heated mash is mechanically worked by the rotating screw operating at a speed sufficient to make the mash flow in a generally fluid manner and form a plasticized dough.

The action of the rotating screw and extruder conditions of temperature and pressure maintain the plasticized dough in a homogeneous, free-flowing state. After the dough has been sufficiently cooked, sheared and plasticized, the plasticized dough is forced through the die located at the outlet of the extruder 50.

Since the extruded food product emerges from an environment of high temperature (commonly at about 250° F.) and pressure into an environment of lower temperature and pressure, such as ambient or room temperature and pressure, the extrudate expands upon leaving the extruder 50. Entering into a lower temperature and pressure results in a cooling of the extrudate and partial loss of water in the form of steam, and the gelatin of the extrudate may set and form a gel upon entering the lower temperature.

The extrudate leaves the extruder 50 in an extended ribbon 59, which is cut by any conventional cutting means, such as at least one knife or blade assembly 70 attached to the extruder to form individual particles typically having a diameter of approximately ⅛ to 2 inches. The size may be controlled by selecting a die aperture of appropriate dimensions. The length of the particles or particulates ranges from about 1/16 to about 2 inches. The extruded particles have a bulk density between about 20 and about 50 lbs. per bushel upon exiting the extruder 50.

The extruded particle need not be provided to an animal in any special manner, but, in certain embodiments, the extruded product is simply fed to an animal. It is contemplated, for instance, the extruded product may be useful in conjunction with the feeding of a horse, a cow, a sheep, a pig, a rabbit, a guinea pig, a gerbil, a cat, a dog, a fish and other aquatic animals and more generally, any other animal. It is further contemplated in some embodiments that the extruded product may be provided in a form intended and suitable for human consumption, i.e., that the "animal" is a human and that the extruded food product is intended for human consumption.

It will be appreciated that both the composition and size of the extruded product will be expected to vary depending on the animal for which the extruded product is intended. In any event, other ingredients, such as colorants, flavorings, and the like may be incorporated into the food composition when practicing the present invention. In some implementations, the extruded product may be an extruded food particle formed by the above-described processes and may include a composition of nutritional food components, which may include the aforementioned other ingredients, a starch fraction having a concentration of less than about 15 weight percent starch and gelatin having a concentration of up to 15 weight percent. The gelatin may be substantially distributed throughout the food particle and in a form effective to bind the food particle in a particle form. By providing the starch fraction in a concentration of less than about 15 weight percent, the starch is ineffective as a binder. In some implementations, the gelatin may have a concentration of about 0.5 to about 15 weight percent, or a concentration of about 1.0 to about 10 weight percent. In some implementations, the composition of the extruded product may contain less starch or no starch. Generally, when present, the starch is provided as an amount of the composition that is insufficient for the starch to serve as a binder for the food composition.

The extruded particles may be transferred using an air conveyor between the extruder 52 and the dryer 170 or a mechanical conveyor like a belt conveyor. The integrity of the particle is important at this stage of the process. The binder gelatin of the present invention retains the food composition in particle form during conveyance until the particle is dried to a harder and more stable form. If an air conveyor is used to transport the extruded particle, then a higher concentration of the gelatin may be required to prevent breakage and degradation of the extruded particle during transport. If a mechanical conveyor is used, then a lower concentration of the gelatin may be required for transport.

In general, any dryer that is capable of reducing the moisture content of the extruded particle is suitable for use in practicing the present invention. After drying, the particles generally have a bulk density of about 20 to about 50 lbs. per bushel and a moisture content of less than about 12 percent.

The extruded particle may also be characterized in terms of percent (%) durability. As used herein, the term "percent durability" refers to an art recognized durability test, generally referred to as a K-State durability test modified by the use of chrome balls, and a different tumbling time. In the modified durability test, the durability of product may be obtained immediately after cooling when the product has a temperature within 10° F. of ambient temperature, and may be obtained after extruding and cooling but prior to drying. Durability is determined by tumbling a 350 g sample of pre-sieved particles (to remove fines) with eight ⅞" chrome steel balls for 3 minutes at 50 RPM in a dust-tight 12"× 12"×5" enclosure equipped with a 2"×9" internal plate affixed symmetrically along a 9" side to a diagonal of one 12"×12" dimension of the enclosure. The enclosure available from Seedboro Equipment Co. is rotated about an axis perpendicular to and centered on the 12" sides thereof. After tumbling, fines are removed by screening, and the particle sample is re-weighed. Percent (%) durability is defined as:

$$100 \times \frac{\text{Weight of particle after tumbling}}{\text{Weight of particle before tumbling}}$$

In general, the final extruded particle of the present invention has a percent durability of at least approximately 70 percent when practicing the present invention.

The extruded particles may be characterized by "percent floatability". This relates to the percent of particles that can float after a defined time period. The percent floatability is applicable to feed that needs to be suspended in water, i.e. fish feed. Fish feed, for example, preferably has floatability of about 70 percent or greater after one minute using some of the methods described herein.

The following examples are illustrative only and not intended to limit the present invention.

EXAMPLE

This example illustrates the use of gelatin as a binder during extrusion of a low starch fish feed. The amount of gelatin used varied from about 10 percent by weight to about 0.1 percent by weight. Table 2 below lists the compositions of the various rations having varying amounts of gelatin.

TABLE 2

|  | 10% gelatin Ration A | 5% gelatin Ration B | 2.5% Gelatin Ration C | 1.0% gelatin Ration D | 0.5% gelatin Ration E | 0.1% gelatin Ration F |
| --- | --- | --- | --- | --- | --- | --- |
| Gelatin | 10.0 | 5.0 | 2.5 | 1.0 | 0.5 | 0.1 |
| Soybean flour | 19.5 | 24.5 | 27.0 | 28.5 | 29.0 | 29.4 |
| Red blood cells | 27.0 | 27.0 | 27.0 | 27.0 | 27.0 | 27.0 |
| Dried whole egg | 1.0 | 1.0 | 1.0 | 1.0 | 1.0 | 1.0 |
| Fish meal | 29.0 | 29.0 | 29.0 | 29.0 | 29.0 | 29.0 |
| Salt | 3.0 | 3.0 | 3.0 | 3.0 | 3.0 | 3.0 |
| Fish oil | 7.6 | 7.6 | 7.6 | 7.6 | 7.6 | 7.6 |
| Vit., min. etc. | 2.9 | 2.9 | 2.9 | 2.9 | 2.9 | 2.9 |
| Total | 100 | 100 | 100 | 100 | 100 | 100 |

The mixtures were extruded using a eight head screw extruder (Model X-20, Wenger Mfg. Co., Sabetha, Kans.) under the extruder conditions listed in Table 3 below.

TABLE 3

|  | Ration | | | | | |
| --- | --- | --- | --- | --- | --- | --- |
|  | A | B | C | D | E | F |
| Cond. Meal ° F. | 201 | 209 | 213 | 212 | 211 | 214 |
| Water Cond. Lbs./min | .35 | .36 | .4 | .4 | .4 | .4 |
| Water barrel lbs./min | .11 | .21 | .73 | .5-1.0 | 1.4 | 1.4 |
| Extruder RPM | 494 | 497 | 495 | 492 | 493 | 492 |
| Extruder Amps | 36 | 30 | 30 | 30 | 28 | 29 |
| Steam on 3 jackets | − | − | − | + | + | + |
| Feeder setting % | 25 | 25 | 25 | 25 | 25 | 25 |
| Density wet lbs./bu | 16 | 22 | 23 | 27.5 | 32 | 30 |
| Die hole diameter, in | 5/32 | 5/32 | 5/32 | 5/32 | 5/32 | 5/32 |
| Number of holes | 1 | 1 | 1 | 1 | 1 | 1 |
| Number of knife blades | 6 | 6 | 6 | 6 | 6 | 6 |
| Barrel setup | | | 8 head | | | |
| Final product rate out of extruder - | | | 6.2 lbs./min | | | |
| Float, % after 1 minute | 100 | 100 | 85 | 70 | 10 | 0 |
| Float, % after 15 minutes | 100 | 100 | 100 | 75 | 25 | 0 |
| Float, % after 60 minutes | 100 | 100 | 100 | 95 | 0 | 0 |

The float characteristics of the food obtained using the different concentrations of gelatin after drying for 1 minute, 15 minutes and 60 minutes in a three drawer batch dryer are also shown in Table 3. Rations A and B made good product that floated well for about an hour. Rations C and D had some particles that sank quickly but then refloated. This might not have happened if the water was not perfectly still like it was in the lab tests. Ration F with 0.1% gelatin did not hold together well and sank quickly. Ration E with 0.5% gelatin might hold the particles together for a sinking ration but not well enough for a floating feed.

Although the present invention has been described with reference to preferred embodiments, workers skilled in the art will recognize that changes may be made in form and detail without departing from the spirit and scope of the invention.

What is claimed is:

1. A method for producing an extruded animal feed particle, the method comprising:
   extruding through an extruder having a screw within a barrel, a feed composition comprising nutritional feed components and gelatin; and
   drying the extruded composition to form the extruded animal feed particle having a moisture content of less than about 12% by weight of the feed particle after drying,
   wherein the gelatin is substantially distributed throughout the feed composition and binds the feed composition in the extruded animal feed particle after exiting the extruder and after drying,
   wherein the gelatin is present at about 0.2 to 0.3 weight percent of the feed particle during extrusion when the extruded animal feed particle has a particle size of less than about 3/8 inch and gelatin is present at about 0.3 to 5 weight percent of the feed particle during extrusion when the extruded animal feed particle has a particle size of about 3/8 inch or larger,
   wherein any starch in the feed composition has a concentration of less than 15 weight percent after drying and is insufficient and unavailable to serve as a binder, and
   wherein the particle has a percent durability of at least approximately 70% as determined by a modified K-state durability test.

2. The method of claim 1 wherein the extruder is operated at a temperature sufficient to solubilize the gelatin.

3. The method of claim 1 wherein the gelatin forms a gel that binds the composition when the composition exits the extruder.

4. The method of claim 1 and further comprising the step of cooling the composition upon exiting the extruder to at least a temperature at which the gelatin sets to form a gel.

5. The method of claim 1 and further comprising the step of grinding the feed composition before extruding in the extruder.

6. The method of claim 5 wherein the feed composition has been ground through a screen having a size of about 12/64 inches or less before extruding in the extruder.

7. The method of claim 5 wherein the feed composition has been ground through a screen having a size of about 6/64 inches or less before extruding in the extruder.

8. A particle made by the method of claim 1 characterized by its durability after extrusion and prior to drying.

9. A method of forming a food particle, the method comprising:
   extruding a food composition through an extruder having a screw within a barrel, the food composition comprising nutritional food factors and a binder consisting of gelatin, the gelatin substantially distributed throughout the food composition once the food composition exits the extruder such that the food particle is formed;
   drying the extruded food particle to a moisture content of less than about 12% by weight of the food particle, wherein the gelatin distributed throughout the food composition binds the food composition in the extruded food particle after exiting the extruder and after drying, wherein the gelatin is present at about 0.5 to about 10.0 weight percent of the food particle during extrusion when the extruded and dried food particle has a particle size of about 5/32 inch, wherein any starch in the feed composition has a concentration of less than 15 weight percent after drying and is insufficient and unavailable to serve as a binder, and wherein the particle has a percent durability of at least approximately 70% as determined by a modified K-state durability test.

10. The method of claim 9 wherein the extruder is operated at a temperature sufficient to solubilize the gelatin.

11. The method of claim 9 wherein the gelatin forms a gel that binds the composition when the composition exits the extruder.

12. The method of claim 9 wherein the gelatin is at a concentration that ranges from about 1.0% to about 10% by weight of the food particle.

13. The method of claim 9 wherein the composition has a moisture content of less than about 12% moisture by weight of the food particle after drying.

14. The method of claim 9 and further including:
cooling the composition upon exiting the extruder to at least a temperature at which the gelatin sets to form a gel.

15. The method of claim 9 and further including the step of grinding the food composition before extruding in the extruder.

16. The method of claim 15 wherein the food composition has been ground through a screen having a size of about 12/64 inches or less before extruding in the extruder.

17. The method of claim 16 wherein the food composition has been ground through a screen having a size of about 6/64 inches or less before extruding in the extruder.

18. A particle made by the method of claim 10 characterized by its floatability after extrusion and drying.

* * * * *